Sept. 16, 1969      N. C. REID      3,466,780
FRAME MOUNT FOR A FILM TRANSPARENCY
Filed Oct. 6, 1967
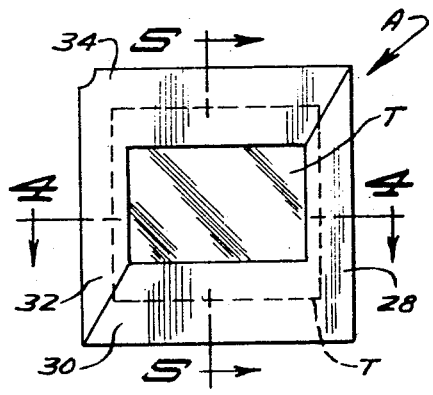
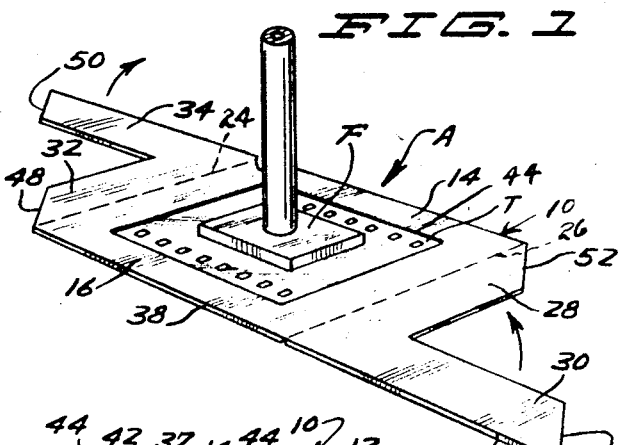
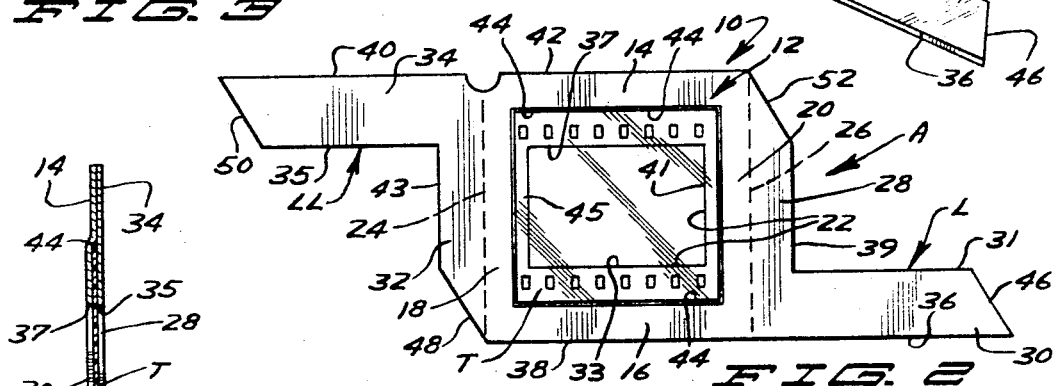
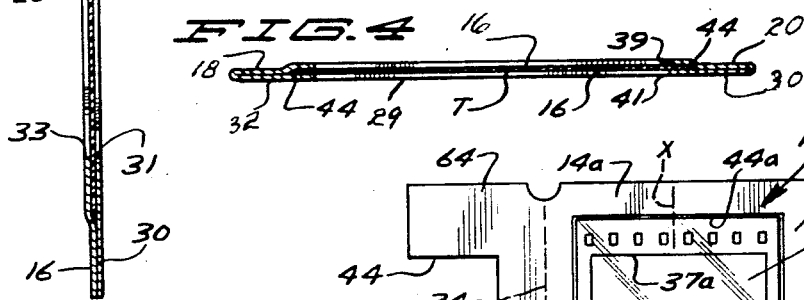
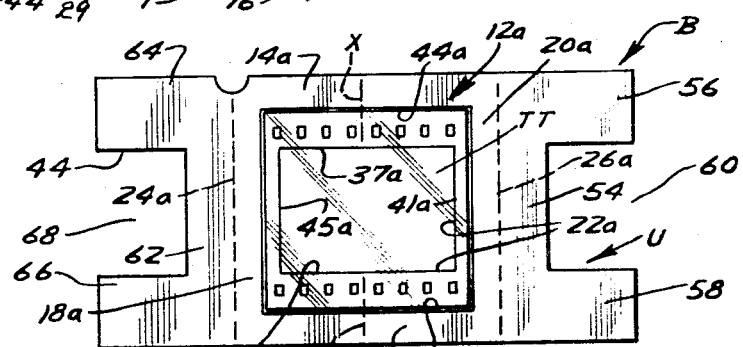
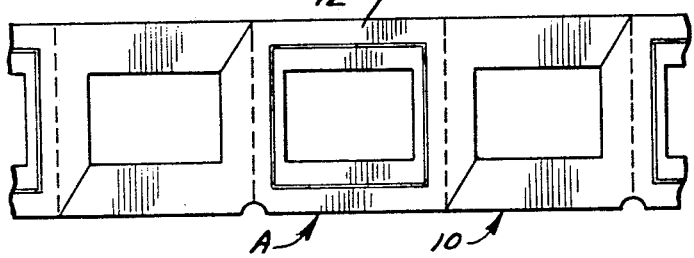
INVENTOR.
NORMAN C. REID
BY Carlsen, Carlsen,
Sturm & Hicks
ATTORNEYS

United States Patent Office 3,466,780
Patented Sept. 16, 1969

3,466,780
FRAME MOUNT FOR A FILM TRANSPARENCY
Norman C. Reid, Crystal, Minn., assignor to Pako Corporation, Minneapolis, Minn., a corporation of Minnesota
Filed Oct. 6, 1967, Ser. No. 673,382
Int. Cl. G09f 1/12
U.S. Cl. 40—158     6 Claims

ABSTRACT OF THE DISCLOSURE

The disclosure relates to a frame mount for a film transparency and includes a primary frame portion having spaced opposed side members, said members defining a opening. A secondary frame portion is provided which is hingedly connected at opposed edges to opposed edges of the primary frame portion. The secondary frame portion is separated to thereby divide the same into two portions which when folded and secured upon the primary frame portion form the completed secondary frame portion and also the mount, the secondary frame portions bypassing a member holding a film transparency upon and centrally of the base portion. The film transparency is secured between the primary frame portion and the secondary frame portion.

Summary of the invention

The invention relates to a frame mount for a film transparency and more particularly to a mount constructed to two frame portions which are hingedly brought together and secured in overlying relation with a film transparency secured therebetween. With known transparency mounts two full frame portions are brought together and secured upon a film transparency. With such a construction in the film transparency cannot be held in position on a frame portion by holding device such as a vacuum foot or the like, for the remaining frame portion cannot be folded to a position upon the first named frame portion due to the vacuum foot obstructing the folding movement.

It is an object of the invention to provide a frame mount for a film transparency having a primary frame portion and a secondary frame portion, the secondary frame portion formed in two portions, each portion hingedly connected to an edge of the primary frame portion, the two portions foldable to a position upon the primary frame portion. When the two portions of the secondary frame portion are folded upon the primary frame portion the same bypass a device holding the film transparency in position upon the primary frame portion.

These and other more detailed and specific objects will be disclosed in the course of the following specification, reference being had to the accompanying drawings, in which—

In the drawings forming part of this application:

FIG. 1 is a perspective view of the mount for photographic transparencies in a flattened die cut blank condition with a vacuum foot shown as holding the transparency in position on the primary frame portion of the mount prior to folding the secondary half frame portions of the mount upon the transparency and the primary frame portion.

FIG. 2 is a top plan view of the mount in flattened condition with a transparency in position thereon.

FIG. 3 is a top plan view of the mount in folded position upon a transparency.

FIG. 4 is a sectional view on the line 4—4 of FIG. 3.

FIG. 5 is a sectional view on the line 5—5 of FIG. 3.

FIG. 6 is a top plan view of an alternative form of mount in an open flattened condition.

FIG. 7 is a top plan view of several of the mounts in connected condition as when die cut from a strip of material.

Referring to the drawings in detail, the mount A is formed from the die cut blank 10. The mount blank 10 includes the primary frame portion 12 formed of the spaced side members 14 and 16 which are connected to the spaced end members 18 and 20. The members 14, 16, 18 and 20 define the rectangular opening 22, and the outer edges of the end members 18 and 20 are defined by the weakened lines 24 and 26, respectively, which act as hinges.

Extending from and coextensive with the weakened hinge portion 26 is the first arm portion 28 from which extends the second arm portion 30 at a right angle thereto, the two arm portions 28 and 30 constituting and L-shaped member L and half of a secondary frame portion 29.

Extending from and coextensive with the weakened hinge portion 24 is the third arm portion 32 from which extends the fourth arm portion 34 at a right angle thereto, the two arm portions 28 and 30 constituting a L-shaped member LL and half of a secondary frame portion 29. The member L together with the member LL form the secondary frame when positioned in registration upon frame portion 12 as will be seen. The lower edge 36 of the second arm portion 30 is an extension of the edge 38 of the lower edge of the side member 16, and the edge 40 of the fourth arm portion 34 is an extension of the edge 42 of the side member 14.

The width of the second arm portion 30 is the same as the width of the side member 16 so that when the arm 30 overlies the side member 16 the edge 31 of arm 30 is in alignment with the edge 33 of side member 16. Similarly, the width of the fourth arm portion 34 is the same as the width of the side member 14 so that when arm 34 overlies the side member 14 the edge 35 of arm 34 is in alignment with the edge 37 of side member 14. The width of the first arm portion 28 is the same as the width of the end member 20 so that when the arm 28 overlies the end member 20, the edge 39 is in alignment with edge 41 of member 20. Similarly, the width of the third arm portion 32 is the same as the width of the end member 18 so that when arm 32 overlies the end member 18 the edge 43 is in alignment with edge 45 of member 18.

The opening 22 in the primary frame portion 12 has formed around the periphery thereof the recess 44 in which is positioned and located in the film transparency T thereby holding the transparency centrally relative to the opening 22 of the frame portion 12. The outer free end of the second arm portion 30 is cut at an oblique angle as at 46, and the outer end of the third arm portion 32 is cut at an oblique angle as at 48 which is complementary to and abuts the angle cut 46 when the member L is folded upon the primary frame 12 with the second arm portion 30 overlying the side member 16 and with member LL folded upon primary frame 12 with the third arm portion 32 overlying end member 18.

The outer free end of the fourth arm portion 34 is cut at an oblique angle as at 50, and the outer end of the first arm portion 28 is cut at an oblique angle as at 52, which is complementary to and abuts the angle cut 50 when the member LL is folded 180° upon the primary frame portion 12 with the fourth arm portion 34 overlying side member 14 together with member L folded upon frame 12 with the first arm portion 28 overlying end member 20. The members L and LL are folded upon the weakened lines 26 and 24, respectively, and with the mount A in the condition above described the same as that illustrated in FIGS. 3, 4 and 5. When the members L and LL are folded as set out above, the arms 30 and 34 thereof bypass the vacuum foot member F which positions and holds the transparency in the recess 44 of the primary base frame portion. The members L and LL are secured upon the primary frame portion by adhesive or other known securing means, and the members L and LL when folded and secured upon base frame 12 in adjoining and registered relationship constitute the secondary frame portion 29 upon the primary frame portion which make up the completed mount A.

In FIGURE 6 is illustrated a further embodiment of the invention indicated as B wherein there is found the blank primary frame portion 12a which is identical to the frame portion 12 and the identical parts bear the same reference numeral accompanied by an a. Instead of the L-shaped member L there is provided the first U-shaped member U composed of the base portion 54 with the spaced leg portions 56 and 58 which define the opening 60. The distance between the legs 56 and 58 is equal to the width of the opening 22a. Further provided is a second U-shaped member UU composed of the base portion 62 with the spaced leg portions 64 and 66 which define the opening 68. The distance between the legs 64 and 66 is equal to the width of the opening 22a. The first U-shaped member U is hingedly connected to the primary frame portion 12a at the weakened portion 26a, and the second U-shaped member UU is hingedly connected to the frame portions 12a at the weakened portion 24a. The first and second U-shaped portions constitute a divided secondary frame portion, and the portions U and UU are folded 180° upon the primary frame portion 12a, whereby the ends of the legs 56 and 64 abut at point x and legs 58 and 66 abut at point y whereby the transparency TT is held in alignment with opening 22a in mount B. It will be seen that when the U-shaped members U and UU are folded upon the primary frame portion 12a the legs of the U-shaped members bypass a member such as F of FIGURE 1 used to position a transparency upon the frame portion 12a for assembly.

It is understood that suitable modifications may be made in the structure as disclosed, provided such modifications come within the spirit and scope of the appended claims. Having now, therefore fully illustrated and described my invention, what I claim to be new and desire to protect by Letters Patent is:

1. A frame mount for a film transparency comprising:
  (a) a primary frame portion defining an opening,
  (b) a secondary frame portion for securement upon and in registration with said primary frame portion,
  (c) said secondary frame portion including separate first and second portions,
  (d) said first portion of said secondary frame portion hingedly connected at one edge to one edge of said primary frame portion,
  (e) said second portion of said secondary frame portion hingedly connected at one edge of said primary frame portion opposed to said edge to which said first portion is hingedly connected,
  (f) said first and second portions brought into registration when said first and second portions are hingedly folded to a position upon said primary frame portion to complete the secondary frame portion which defines an opening coextensive with the opening of said primary frame portion, said first and second portions bypassing the defined opening of said primary frame portion when folded, and
  (g) means for securing said first and second portions upon said primary frame to complete the frame mount.

2. The device of claim 1 in which
  (a) said first portion of said secondary frame portion includes a first arm portion and
  (b) a second arm portion extending at right angle thereto,
  (c) said second portion of said secondary frame includes a third arm portion and
  (d) a fourth arm portion extending at a right angle thereto, said first, second, third, and fourth arm portions overlying portions of said primary frame portion and registering therewith when hingedly folded upon said primary frame portion to form said secondary frame portion.

3. The device of claim 2 in which
  (a) one end of said first arm portion is formed at an oblique angle and
  (b) one end of said second arm portion is formed at an oblique angle,
  (c) one end of said third arm portion is formed at an oblique angle, and
  (d) one end of said fourth arm portion is formed at an oblique angle, said oblique angle formations of said first arm portion and said fourth arm portion registering in abutting alignment and said oblique angle formations of said second arm portion and said third arm portion registering in abutting alignment when said first and second portions of said secondary frame portion are folded upon said primary frame portion.

4. The device of claim 1 in which
  (a) each of said first and second portions of said secondary frame is formed with edges which register in abutting alignment when said first and second portions are folded upon said primary frame portion.

5. The device of claim 1 in which
  (a) each of said first and second portions of said secondary frame portion is U-shaped in formation.

6. The device of claim 1 in which
  (a) said primary frame portion include means for positioning a film transparency thereon.

References Cited

UNITED STATES PATENTS

| | | | |
|---|---|---|---|
| 2,587,109 | 2/1952 | Carroll | 40—159 |
| 3,184,873 | 5/1965 | Turner | 40—158 |
| 3,341,961 | 9/1967 | Shanks | 40—158 |

EUGENE R. CAPOZIO, Primary Examiner

WENCESLAO J. CONTRERAS, Assistant Examiner